United States Patent
Bruun et al.

(10) Patent No.: US 10,284,474 B2
(45) Date of Patent: May 7, 2019

(54) PROVIDING POLICY INFORMATION

(71) Applicant: Hewlett Packard Enterprise Development LP, Houston, TX (US)

(72) Inventors: Peter Michael Bruun, Rungsted Kyst (DK); Marie-Paule Odini, Grenoble (FR); Marc Flauw, Les Ulis (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 72 days.

(21) Appl. No.: 15/120,913

(22) PCT Filed: Dec. 8, 2014

(86) PCT No.: PCT/US2014/069118
§ 371 (c)(1),
(2) Date: Aug. 23, 2016

(87) PCT Pub. No.: WO2015/126507
PCT Pub. Date: Aug. 27, 2015

(65) Prior Publication Data
US 2016/0373359 A1 Dec. 22, 2016

(30) Foreign Application Priority Data
Feb. 24, 2014 (EP) .................................... 14305256

(51) Int. Cl.
*H04L 12/803* (2013.01)
*H04L 12/24* (2006.01)
(Continued)

(52) U.S. Cl.
CPC ........ *H04L 47/125* (2013.01); *H04L 41/0893* (2013.01); *H04L 41/145* (2013.01); *H04L 45/64* (2013.01); *H04L 47/20* (2013.01)

(58) Field of Classification Search
CPC . H04L 47/125; H04L 41/0893; H04L 41/145; H04L 45/64; H04L 47/20
See application file for complete search history.

(56) References Cited

U.S. PATENT DOCUMENTS 7,526,541 B2   4/2009  Roese et al.
8,612,612 B1  12/2013  Dukes et al.
(Continued)

OTHER PUBLICATIONS

ETSI, GSNFV, "Network Functions Virtualisation (NFV); Use Cases." V1 1 (2013): Oct. 2013, 50 pages.
(Continued)

*Primary Examiner* — Jae Y Lee
(74) *Attorney, Agent, or Firm* — Cabinet Beau de Lomenie (57) ABSTRACT

There is described a method for mapping data representing an instance of a service model for a network onto policy information for controlling one or more Software Defined Network (SDN) switches in the network. The instance of a service model comprises a topology of one or more network functions and at least one virtual network function and a data flow through the topology, and the at least one virtual network function defines a dynamic flow control policy in dependence upon which data flow through the virtual network function to or from one or more of the network functions is selectively controlled. The policy information is provided to one or more SDN control entities for controlling the one or more SDN switches in the network so that data flows through the network in accordance with the service model instance.

16 Claims, 5 Drawing Sheets

(51) Int. Cl.
*H04L 12/813* (2013.01)
*H04L 12/715* (2013.01)

(56) References Cited

U.S. PATENT DOCUMENTS

| | | |
|---|---|---|
| 2013/0003745 A1 | 1/2013 | Nishimura |
| 2013/0125112 A1 | 5/2013 | Mittal et al. |
| 2013/0250770 A1* | 9/2013 | Zou .................. H04L 47/19 370/238 |
| 2013/0266007 A1 | 10/2013 | Kumbhare et al. |
| 2013/0311667 A1 | 11/2013 | Payette |
| 2013/0318255 A1 | 11/2013 | Karino |
| 2013/0329601 A1 | 12/2013 | Yin et al. |
| 2014/0189074 A1* | 7/2014 | Parker .................. H04L 63/20 709/220 |
| 2015/0180730 A1* | 6/2015 | Felstaine ............. H04L 41/022 709/225 |
| 2015/0207586 A1* | 7/2015 | Xia .................... H04J 14/0269 398/48 |
| 2016/0234104 A1* | 8/2016 | Hoffmann ........... H04L 41/0806 |

OTHER PUBLICATIONS

ETSI, GSNFV, "Network Functions Virtualisation (NFV): Architectural Framework." ETSI GS NFV 2.2 (2013): V1, 21 pages.

European Patent Office, "European Search Report", 14305256.1, Sep. 4, 2014, 77 pages.

International Searching Authority, "Notification of Transmittal of the International Search Report and the Written Opinion", PCT/US2014/069118, dated Mar. 26, 2015 12 pages.

Walter Häffner, L. Leymann, Network Based Services in Mobile Networks, Jul. 29, 2013, IETF 87, Berlin.

Yong Huang / Huawei Technologies Ltd, VNF Forwarding Graph and Service Graph use case-vAR, Oct. 18, 2013, ETSI NFV SWA WG.

Office Action, EP Applcation No. 14305256.1, dated Aug. 11, 2017, pp. 1-7, EPO.

Rotsos et al., "Network service orchestration standardization: A technology survey", Computer Standards & Interfaces 54 (2017) 203-215.

Fu et al., "What's the Impact of Virtualization on Application-Layer Traffic Optimization (ALTO)?", draft-fu-alto-nfv-usecase-05, Internet Engineering Task Force, Jun. 9, 2015, 11 pp.

* cited by examiner

PROVIDING POLICY INFORMATION

BACKGROUND

Software defined Networking (SDN) is an emerging technology in which software is used to control the forwarding of network packets through physical and/or virtual networks. In the most general sense, SDN can be thought of broadly as covering any networking where a significant proportion of the network switching is not based on traditional dedicated switching hardware but instead is programmable through software technologies. More specifically, one type of SDN involves networking where the data forwarding capability (i.e. the data plane) is de-coupled from the routing, resource and other control functionality (i.e. the control plane). In this type of SDN, there may be multiple SDN switches configured to implement the data plane functions and one or more SDN Information Technology (IT) control applications (i.e. SDN controllers) configured to provide the control plane functions. A single SDN controller may control multiple SDN switches. Each SDN switch is under the control of a single SDN controller. As a result, an SDN Controller may have an end-to-end view of the network topology, and can set up data-paths (flows) spanning different equipment and locations.

Open Application Programming Interface (API) services for accomplishing the necessary communication of the control and data planes in SDN have developed and a well-known example is Openflow. An Openflow switch comprises a flow table with an action associated with each flow in the table to tell the switch how to process the flow and a secure channel that connects the switch to a usually remote SDN controller, allowing commands and pockets to be sent between the controller and the switch using the OpenFlow protocol so that flow entries can be added to, removed from and amended in the table.

An individual flow may be broadly defined by a set of field values in the data packets, for example, a particular Transmission Control Protocol (TCP) connection could be defined by all packets from a particular Medium Access Control (MAC) address field and/or Internet Protocol address field and/or port number field. Each flow entry on a given SDN switch has an action associated with it, of which three examples are, (i) forward a flow's packets to a given port (this allows packet to be routed through the network), (ii) encapsulate and forward a packet to the SDN controller of the switch (so the controller can decide if a flow should be added to a flow table) and (iii) drop this flow's packets. Unclassified packets belonging to new flows may similarly be encapsulated and forwarded to the SDN controller for classification and creation of new forwarding rules across multiple switches to create the intended flow path.

Whenever the SDN controller needs to make decisions it may consult Information Technology (IT) applications and systems that implement various protocols and decision rules. These IT applications and systems are referred to as SDN Apps, and may be inherent in the SDN controller or they may be provided as applications external to the controller, communicating with it by software linking or by various protocols. The decision rules employed by the SDN Apps are referred to as Application Policies and the supported policies and formats may be standardized or defined individually by each SDN App.

Network Functions Virtulization (NFV) is an emerging design approach for constructing Information Technology (IT) applications, particularly in the telecommunications industry. The classical approach to network architecture is based upon fragmented, purpose built hardware for implementing network functions—also known as Physical Network Functions (PNFs) (e.g. firewalls, Deep Packet Inspectors (DPI)), Network Address Translators (NAT)) which require physical installation at every site at which they are needed. In contrast, NFV aims to consolidate many network equipment types onto, for example, standardised high volume servers, switches, and storage through the implementation of Virtualised Network Functions (VNFs) in software which can run on a range of standard hardware. Furthermore, NFV aims to transform network operations because the VNFs can be dynamically moved to, or instantiated in, various locations in the network as required without the need for installation of new hardware. Furthermore, multiple PNFs and VNFs can be configured together to form a 'service-chain' and packets steered through each Network Function in the chain in turn.

The combination of SDN with the NFV approach can be advantageous. For example, to simplify compatibility, operation, and maintenance procedures. Moreover, the separation of the control and data planes enabled by SDN when used with NFV presents an opportuniry to provide for greater efficiency and flexibility of a network, especially in response to changing network conditions, where network flows can immediately adapt to changing/moving VNFs without having to explicitly re-configure the network.

A network service model instance models a data flow through a network. An SDN controller and its SDN Apps can use policy information to configure one or more SDN switches in a network so that data flow in the network is in accordance with the service model instance.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Referring now to the drawings, and first to FIG. 1, there will be described a drawback of one scheme for implementing NFV and SDN together in an example network.

Figure 1:
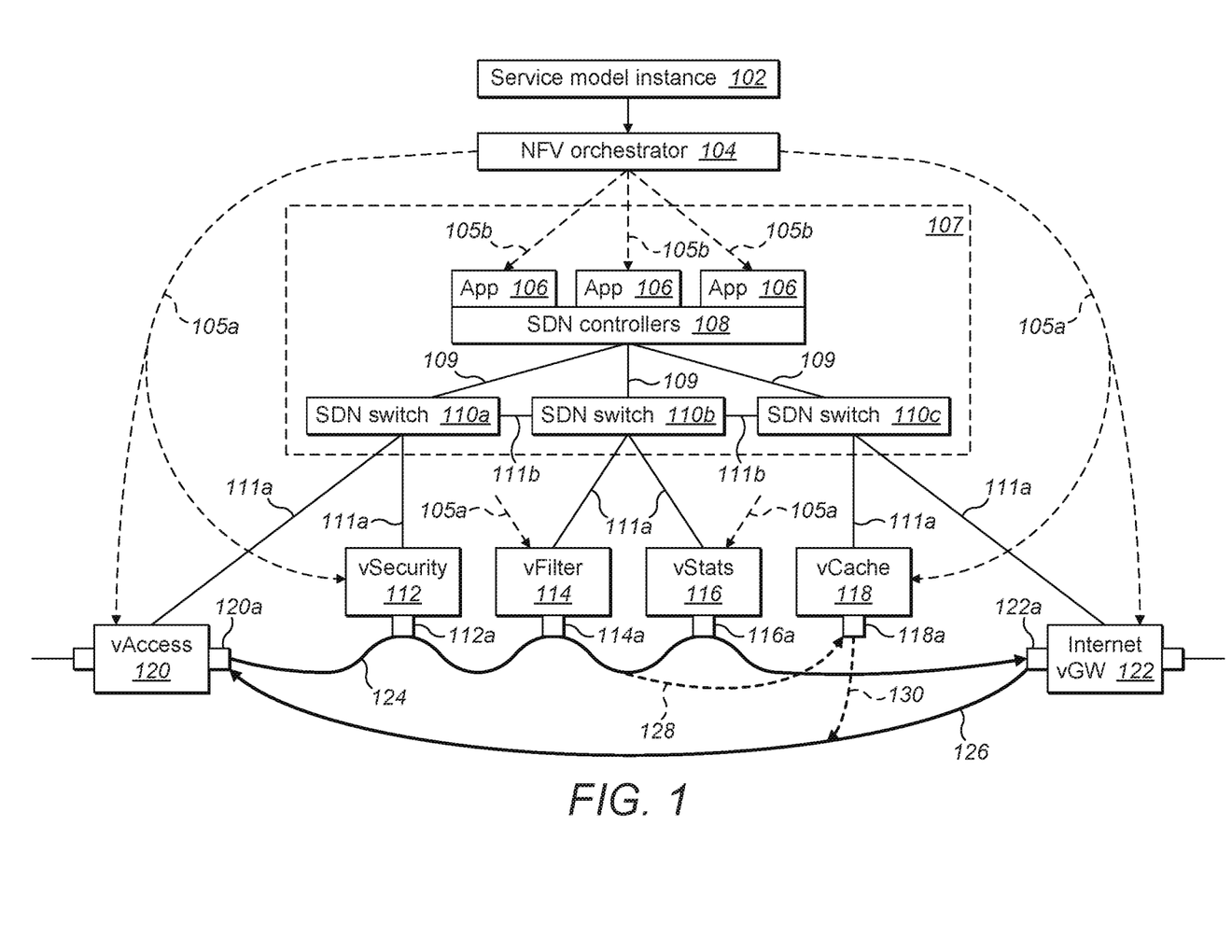
FIG. 1 shows schematically a system for implementing NFV and SDN together in an example network.

FIG. 1 schematically illustrates NFV and SDN being implemented together in a network, in this example, a Telco Gi-LAN.

In FIG. 1, an NFV orchestrator 104 receives as input (or generates itself), a service model design instance 102 which defines a topology of one or more network functions 112 to 122 to be implemented and/or maintained within the network and traffic flow between those network functions 112 to 122. Each network function 112 to 122 may be thought of as a functional building block within the network for performing a defined function on traffic flow through that network function and comprises one or more interfaces 112a to 122a for handling traffic flow.

In this example each network function 112 to 122 is a virtual network function, that is, an implementation of a network function that can be deployed on a suitable NFV Infrastructure (NFVI) (i.e. the totality of all hardware and software components that build up the environment in which VNFs are deployed), typically running as a virtual machine in a Hypervisor (or other resource pooling/sharing) environment.

Alternatively, one or more of the network functions 112 to 122 may be a Physical Network Function (PNF), that is, an implementation of a Network Function, in a tightly coupled software and hardware system.

In addition to defining or describing the network functions 112 to 122, the service model design instance 102 defines a traffic flow between the network functions 112 to 122, for example, by means of an NF forwarding graph which can be thought of as a graph of logical links connecting the network functions for the purpose of describing traffic flow between the network functions.

The NFV orchestrator 104 may, for example, run as software on a physical or virtual server (not shown) to operate, manage and automate the software and infrastructure associated with NFV resources in order to implement the service model instance 102. The NFV orchestrator 104 has control and visibility of all the network functions 112 to 122 including their physical, virtual or logical network interface ports. The NFV orchestrator 104 has one or more suitable input interfaces (not shown) for receiving the service model design instance 102 and one or more suitable external interfaces (not shown) for the interactions required to implement the service model instance 102.

The NFV orchestrator 104 maps the data representing the service model instance 102 into suitable control information 105a, 105b for use in configuring the network to implement the service model instance 102. More specifically, the control information 105a, 105b may comprise NF control information 105a for controlling/creating the network functions 112 to 122 and Application Policy switch control information 105b for use in configuring switches of a switching system 107.

In this example, the switching system 107 comprises one or more Traffic Steering SDN Apps 106 each plugged into a respective one of a plurality of SDN controllers (shown collectively) 108 each for controlling a respective one of a plurality of groups of SDN switches 110. The SDN controllers 108 and the SDN switches 110 may be OpenFlow controllers and OpenFlow switches respectively that interact using the OpenFlow protocol.

The Application Policy switch control information 105b is provided to and used by the Traffic Steering Apps 106 to cause the SDN controllers 108 to configure the SDN switches 110a to 110c so that traffic flow through the network functions 112 to 122 is in accordance with the service model instance 102. This may involve, for example, setting and maintaining appropriate flow tables in one or more of the SDN switches 110. The Traffic Steering Apps 106 and the SDN controllers 108 may communicate using a suitable Application Programming Interface. Alternatively, rather than being a plug in to an SDN controller, the functionality of a Traffic Steering App may be inherent in an SDN controller. The SDN controllers 108 may communicate with the SDN switches 110a to 110b using a suitable protocol over links 109.

In the example of FIG. 1, the VNFs are appropriate for a Telco Gi-LAN and include functions for providing security (e.g. by vSecurity 112) for example implemented as a firewall, packet filtering (e.g. by vFilter 114), gathering of statistics (e.g. by vStats 116), and caching (e.g. by vCache 118). The example VNFs further include an access point (e.g. vAccess 120) and an Internet gateway (e.g. Internet vGW 122).

In accordance with the service model instance 102, data packets are steered through or around the Network Functions 112 along a forward path indicated by the dark continuous arrow 124 and a different return path indicated by the light continuous arrow 126.

It will be appreciaied that the link between any two interfaces 112a to 122a of any two Network Functions 112 to 122, for example, the link between the interface 112a of the Network Function 112 and the interface 114a of the Network Function 114 is a logical link only and that actual data packet flow from one Network Function to another occurs via one or more of the SDN switches 110 via links 111a (which link an NF to a switch) and/or links 111b (which link switches). For example, data packets pass from the Network Function vSecurity 112 to the Network Function vFilter 114 by passing from the Network Function vSecurity 112 to the SDN switch 110a, then to the SDN switch 110b, and then to the Network Function vFilter 114.

In the service model instance 102 of FIG. 1, the model for each of the Network Functions 112 to 122 allows for static flow connectivity and path topology between Network Functions but does not allow for dynamic flow choices and path topology.

As such, it is not possible for the service model instance 102 to be used to implement dynamic flow choices of the type illustrated in FIG. 1 by the broken line arrow 128 on the forward path (e.g. instead of the flow being steered from vFilter 114, to vStats 116, to vGW 122, it is steered from vFilter 114 to vCache 118) and by the broken line 130 on the return path (e.g. as a consequence of the dynamic flow change on the forward path, in the return path the flow is steered from vCache 118 to vAccess 120 instead of from vGW 122 to vAcess (120).

Currently, implementing such flow choices can only be achieved by manually managing the algorithms and policies used by each of the SDN Apps individually. This is not ideal, particularly because the configurations will then have to be maintained out of context of the end-to-end flow they contribute to some part of.

Figure 2A:
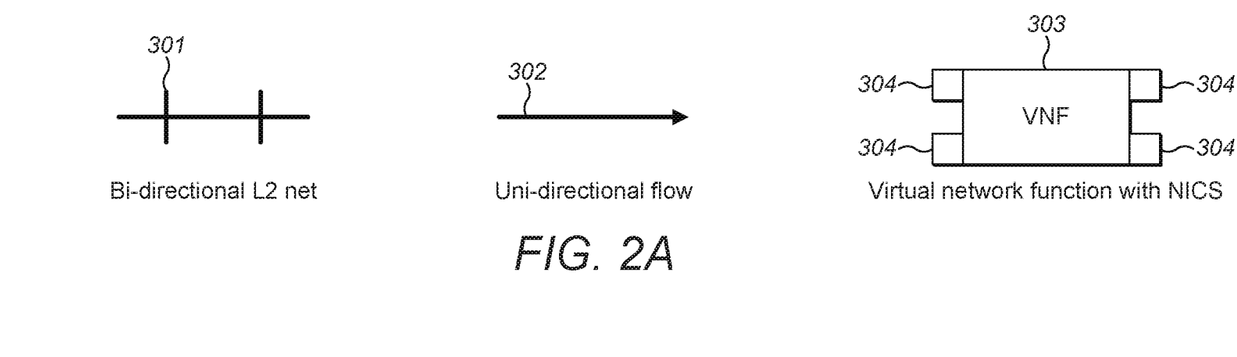
FIG. 2a schematically shows examples of basic service model building blocks for an NFV service model.

Referring now to FIG. 2a, there is schematically illustrated three known basic service model building blocks 301 to 303 used to construct service model instances from an overall service model for NFV orchestrators such as the one shown in FIG. 1. The model building blocks 301 to 303 constitute a sub-set of the total number of service model building blocks currently available for constructing service model instances from the overall service model. The block 301 represents a standard bi-directional Layer 2 (i.e. the data link layer in the OSI reference model), the block 302 represents uni-directional data flow, and the block 303 represents a VNF comprising network interfaces 304.

Figure 2B:
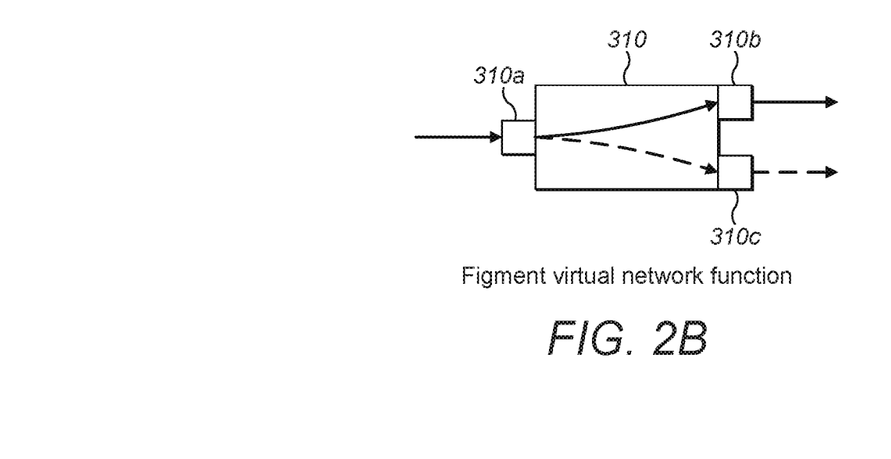
FIG. 2b schematically shows a new service model building block.
Figure 3:
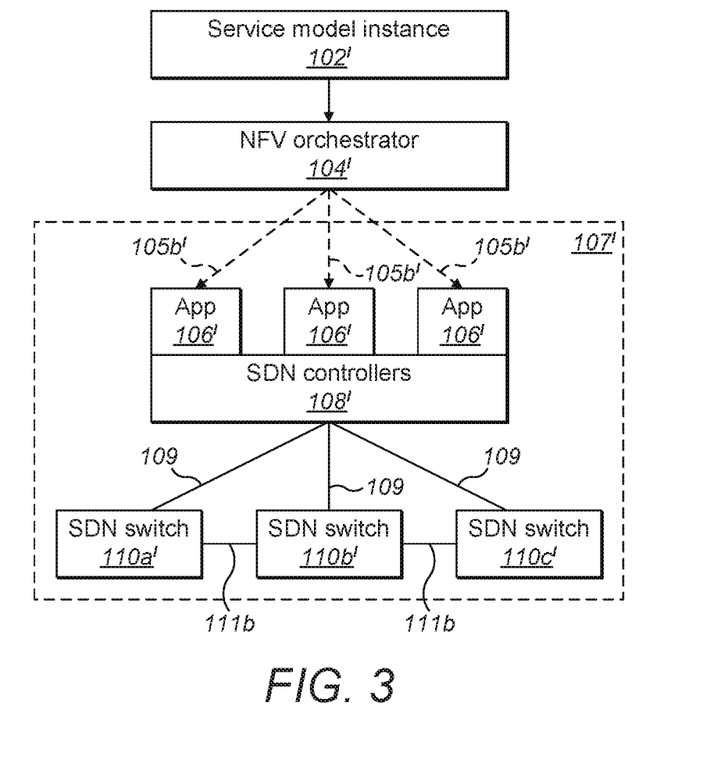
FIG. 3 schematically shows a system for implementing NFV and SDN together in an example network.

Referring now to FIG. 2b and FIG. 3, embodiments of the present invention make use of a model of a new type of VNF 310 termed a Figment VNF (FVNV). The FVNF 310 comprises one or more virtual input interfaces 310a for receiving one or more input flows and one or more virtual output interfaces 310b, 310c through either of which a received flow can be forwarded. The FVNF 310 further encapsulates a dynamic flow control policy (represented by 'Forwarding Policy' in FIG. 2b) for instructing one or more SDN Apps 106' (or one or more SDN controllers 108') to control one or more SDN switches 110' to selectively control a flow based on one or more conditions (or rules) defined by the flow control policy, for example, to select which of the output interfaces 310b, 310c the received flow(s) are to be forwarded through, based on conditions defined by the dynamic flow control policy.

Advantageously, when one or more FVNFs 310 are included or modified in a service model design instance 102' being processed by a suitably configured NFV orchestrator 104', the NFV orchestrator 104' using a catalog of one or more NFV Apps and associated parameterized policy templates maps the service model design instance 102' (including as components of the instance one or more FVNFs 310) onto switch policy information 105b'. The switch policy information 105b' is then pushed out to (or is pulled) by the switching system 107' for use in configuring the one or more SDN switches 110' so that traffic flow through the network functions is implemented in accordance with service model design instance 102' (including the dynamic flow control policies modelled by the one or more FVNFs).

It should be appreciated that the Figment VNFs 310 are truly virtual elements (i.e. notional in the sense that they have no physical correspondence in the network and are not realized using virtual machines executing software to perform the dynamic switching) but instead represent encapsulations of dynamic flow control (e.g. forwarding) policies that the NFV orchestrator 104' pushes to the SDN Apps 106'/SDN controllers 108' of the switching system 107' in the switch policy information 105b'.

Figure 4:
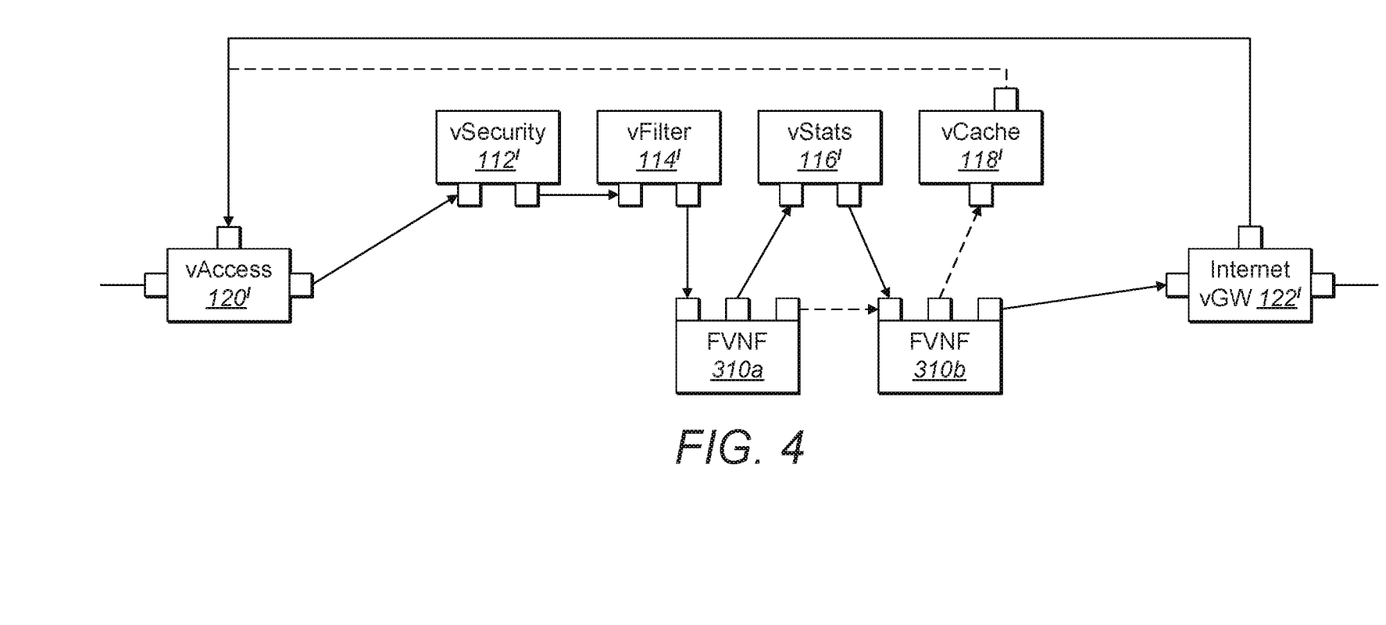
FIG. 4 shows an instance of a service model incorporating a model building block of FIG. 2b.

Referring again to FIG. 3, the service model design instance 102 of FIG. 1, is re-expressed as service model design instance 102' which, as illustrated in FIG. 4, in addition to the Network Functions vSecurity 112'. vFilter 114', vStats 116', vCache 118', vAccess 120' and vGW 122' further comprises a first FVNF 310a and a second FVNF 310b.

The forward flow path indicated by the dark continuous arrow 124 in FIG. 1 is re-expressed as the forward flow path indicated by the continuous dark arrows in FIG. 4 and the dynamic flow choice of the forward path indicated by the broken line arrow 128 is re-expressed by broken line dark arrows in FIG. 4. Similarly, the return path indicated by the light continuous arrow 126 in FIG. 1 is re-expressed as the light continuous arrow in FIG. 4 and the dynamic flow choice of the return path indicated by the light broken line arrow 130 in FIG. 1 is re-expressed as the light broken line arrow in FIG. 4.

Accordingly, logically, the forward flow path indicated by the continuous dark arrows in FIG. 4 is received from the vFilter 114' at a first interface of the first FVNF 310a; output from a second interface of the first FVNF 310a to a first interface of vStats 116', output from a second interface of vStats 116' to a first interface of the second FVNF 310b and output from a third interface of the second FVNF 310b to a first interface of vGW 122'. In contrast, logically the dynamic forward flow path choice indicated by the broken line dark arrows in FIG. 4 is output from a third interface of the first FVNF 310a to the first interface of the second FVNF 310b and output from a second interface of the FVNF 310b to a first interface of the vCache 118'.

Logically, the return flow path indicated by the continuous light arrow is output from a second interface of vGW 122' to a first interface of vAccess 120'. In contrast, logically, the dynamic return flow path choice indicated by the light broken line arrow is output from a second interface of vCache 118' to a first interface of vAccess 120'. It will be appreciated that each of the Network Functions 112' to 122' has an additional interface relative to the corresponding Network Functions 112 to 122 in FIG. 1 to accommodate the re-pressed forward and return flow paths incorporating dynamic flow path choices.

Again, it will be appreciated that the link between any two interfaces of any two Network functions 112' to 122' (or FVNFs 310a, 310b) is a logical link only and that actual data packet flow from one Network Function 112' to 122' to another occurs via one or more of the SDN switches 110 via links (not shown in FIG. 3) which link an NF to a switch and/or links 111b' (which link switches). Accordingly, Data packets pass to and from the Network Functions 112' to 122' along the forward and return flow paths via one or more SDN switches configured by the SDN Apps 106'/SDN controllers 108' in accordance with the dynamic flow decision policies encapsulated by the first and second FVNFs 310a and 310b and provided to the SDN Apps 106'/SDN controllers 108' in the switch policy information 105b'.

Under the control of the one or more the SDN Apps 106'/SDN controllers 108', the one or more SDN switches 110' can dynamically switch between the flow path choices in accordance with the switch policy information 105b'. For example, the forward and return flow paths indicated by the continuous lines may be implemented for a first number of packets to ensure authenticity, while subsequent packets may take a different route once validated.

A FVNF may encapsulate different types of dynamic flow control policies for providing to one or more SDN Apps (or controllers), for example, multiple input flow selection and merging, traffic flow load balancing, joining of forward and return paths.

For example, in one service model instance, the at least one virtual network function comprises one or more input interfaces and one or more output interfaces, and at least two input interfaces each receives a respective data flow and the respective data flows are merged into a merged data flow which is selectively forwarded through at least one of the one or more output interfaces in dependence upon the dynamic flow control policy.

The FVNFs allow for all flow choices to be represented at the abstract design level, and since network condition policies are included, total dynamic flow choice behaviour can be encapsulated in one service model instance.

It should be noted that in embodiments of the present invention, the service model does not mandate a specific implementation of the FVNFs. Indeed, the selection of appropriate technology for carrying out an instance of the service model may be determined, for example, by the NFV Orchestrator according to an inventory of technology present in the network it is to direct. A FVNF may be annotated with abstract policy meta-data to facilitate the selection of appropriate technology by the NFV Orchestrator. For example, if the applicable SDN technology is present in a given location, then the NFV Orchestrator may decide to create a service model instance that incorporates one of more Figment VNFs. In locations where only legacy technology is available, however, a service model instance that does not include any Figment VNFs may be mapped to legacy traffic steering technology. In this way, a framework for exploiting the dynamic capabilities of SDN for service models within a network incorporating NFV and classical networks, is provided.

It will be appreciated that the one or more SDN switches need not be implemented as physical devices but may be implemented as Virtual switches as parts of hypervisors and/or Virtualized switches as switching software running as an application on a virtual machine (VM).

Although in this example the network is a Telco Gi-LAN, this need not be the case and the network may comprises different types of networks and/or combinations of networks.

Figure 5:
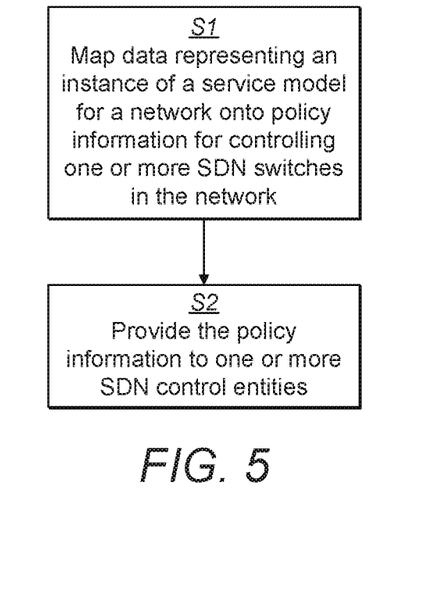
FIG. 5 is a flow diagram illustrating a method according to an example.

FIG. 5 is a flow diagram showing a method according to an example. This method may be performed by the NFV orchestrator 104'. The method comprises a first step S1 of mapping data representing an instance of a service model for a network onto policy information for controlling one or more SDN switches in the network. The instance of a service model comprises a topology of one or more network functions and at least one virtual network function and a data flow through the topology, and the at least one virtual network function defines a dynamic flow control policy in dependence upon which data flow through the virtual network function to or from one or more of the network functions is selectively controlled. The method comprises a second step S2 of providing the policy information to one or more SDN control entities for controlling the one or more SDN switches in the network so that data flows through the network in accordance with the service model instance.

Figure 6:
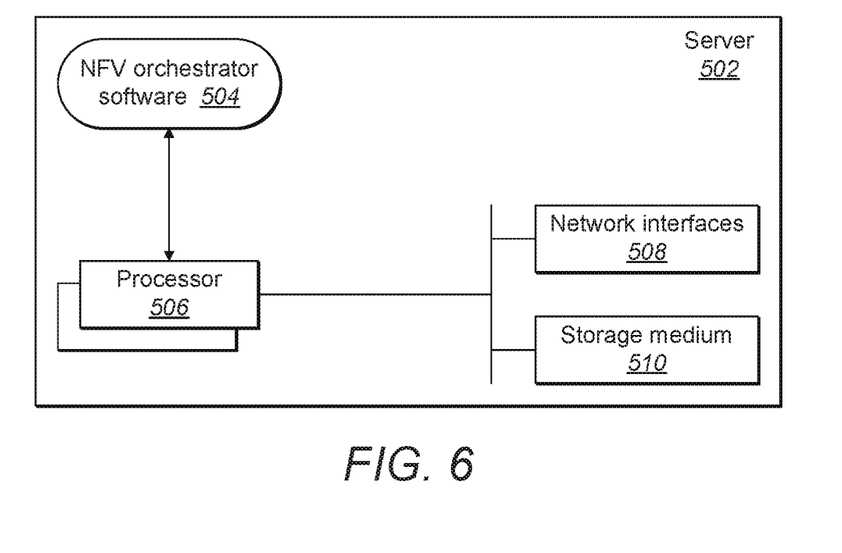
FIG. 6 illustrates a server.

FIG. 6 depicts example components of a server 502, which in one example, implements the NFV orchestrator 104' of FIG. 3. The server 502 includes software 504 that is executable on one or more multiple processors 506 to implement the described functions of the NFV orchestrator 104'.

A processor 506 can include a microprocessor, microcontroller, processor module or subsystem, programmable integrated circuit, programmable gate array, or another control or computing device.

The server 502 further comprises one or more network interfaces 508 to allow the server 502 to communicate with the switching system 107' and Network Functions.

The server 502 further comprises a storage medium 510, which can store various software, data or any other type of information required for the NFV orchestrator 104' to implement its functions.

The storage medium (or storage media) 510 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method comprising:
mapping data representing an instance of a service model for a network onto policy information for controlling an Software Defined Networking (SDN) switch in the network,
wherein the instance of a service model comprises a topology of network function and a network functions virtualization (NFV)-implemented virtual network function (VNF), and a data flow through the topology,
wherein the NFV-implemented VNF comprises a virtual input interface receiving an input flow and a virtual output interface to which the input flow is forwarded,
wherein the NFV-implemented VNF defines a dynamic flow control policy in dependence upon which data flow through the VNF to or from the network function is selectively controlled,
wherein the dynamic flow control policy instructs an SDN control entity to control the SDN switch to selectively control the data flow according to rules defined by the dynamic flow control policy by selecting the virtual output interface the input flow received at the virtual input interface is to be forwarded; and
providing the policy information to the SDN control entity so that data flows through the network in accordance with the service model instance and so that SDN is combined with NFV,
wherein the NFV-implemented VNF provides for the combination of the SDN with the NFV by encapsulating the dynamic flow control policy as a virtual element having no physical correspondence in the network and not being realized using virtual machines to perform dynamic switching,
and wherein the NFV-implemented VNF encapsulates the dynamic flow control policy by representing encapsulations of the dynamic flow control policy that an NFV orchestrator in communication with the SDN control entity pushes to the SDN control entity.

2. The method of claim 1 wherein:
the dynamic flow control policy is a data flow steering policy in dependence upon which data flow to the NFV-implemented VNF from the network function is selectively controlled and/or in dependence upon which data flow forwarded from the NFV-implemented VNF to the network function is selectively controlled.

3. The method of claim 1 wherein the dynamic flow control policy is for implementing load balancing.

4. The method of claim 1 wherein the network function comprises a physical network function.

5. The method of claim 1 wherein the network functions comprises a virtual network function.

6. The method of claim 1, wherein the SDN control entity comprises a controller for the software defined switch and/or an application for the controller.

7. The method of claim 6 wherein the controller is an OpenFlow controller.

8. The method of claim 1, wherein the data flows through the network in accordance with the service model instance.

9. The method of claim 1, wherein the SDN control entities control the SDN switches, the data correspondingly flowing through the network in accordance with the service model instance.

10. The method of claim 9, wherein the SDN switches, as controlled by the SDN control entities, route the data through the network in accordance with the service model instance.

11. The method of claim 1, further comprising:
programming, by the SDN control entities, the SDN switches, based on the provided policy information onto which the data representing the instance of the service model has been mapped.

12. The method of claim 11, further comprising:
routing, by the programmed SDN switches, the data through the network in accordance with the service model instance.

13. A non-transitory computer-readable storage medium comprising a set of computer-readable instructions stored thereon, which, when executed by a processing system, cause the processing system to:
process data representing an instance of a service model for a network to generate policy information for controlling a Software Defined Network (SDN) switch in the network,
wherein the instance of a service model defines an arrangement of network functions including a network functions virtualization (NFV)-implemented virtual network function (VNF), and a data flow through the arrangement of network functions,
wherein the at NFV-implemented VNF comprises a virtual input interface receiving an input flow and a virtual output interface to which the input flow is forwarded,
wherein the NFV-implemented VFN encapsulates a dynamic flow control policy based upon which data flow through the VNF is selectively controlled,
wherein the dynamic flow control policy instructs an SDN control entity to control the SDN switch to selectively control the data flow according to rules defined by the dynamic flow control policy by selecting the virtual output interface the input flow received at the virtual input interface is to be forwarded; and
provide the policy information to the SDN control entity so that data flows through the network in conformity with the service model instance and so that SDN is combined with NFV,
wherein the NFV-implemented VNF provides for the combination of the SDN with the NFV by encapsulating the dynamic flow control policy as a virtual element having no physical correspondence in the network and not being realized using virtual machines to perform dynamic switching,
and wherein the NFV-implemented VNF encapsulates the dynamic flow control policy by representing encapsulations of the dynamic flow control policy that an NFV orchestrator in communication with the SDN control entity pushes to the SDN control entity.

14. The non-transitory computer-readable storage medium of claim 13 wherein: the dynamic flow control policy is a data flow steering policy in dependence upon which data flow to the the NFV-implemented VNF from the network function is selectively controlled and/or in dependence upon which data flow forwarded from the NFV-implemented VNF to the network function is selectively controlled.

15. Apparatus comprising a processor and a non-transitory computer-readable data storage medium storing program code executable by the processor to:
process data representing an instance of a service model for a network to generate control information for controlling a Software Defined Network (SDN) switch in the network,
wherein the instance of a service model defines a topology of network function and a network functions virtualization (NFV)-implemented virtual network function (VNF), and a data flow through the topology,
wherein the NFV-implemented VNF comprises a virtual input interface receiving an input flow and a virtual output interface to which the input flow is forwarded,
wherein the NFV-implemented VNF defines a dynamic flow control policy in dependence upon which data flow through the NFV-implemented VNF to or from the network function is selectively controlled,
wherein the dynamic flow control policy instructs an SDN control entity to control the SDN switch to selectively control the data flow according to rules defined by the dynamic flow control policy by selecting the virtual output interface the input flow received at the virtual input interface is to be forwarded;
supply the control information to the SDN control entity so that data flows through the network in accordance with the service model instance and so that SDN is combined with NFV,
wherein the NFV-implemented VNF provides for the combination of the SDN with the NFV by encapsulating the dynamic flow control policy as a virtual element having no physical correspondence in the network and not being realized using virtual machines to perform dynamic switching,
and wherein the NFV-implemented VNF encapsulates the dynamic flow control policy by representing encapsulations of the dynamic flow control policy that an NFV orchestrator in communication with the SDN control entity pushes to the SDN control entity.

16. The apparatus of claim 15 wherein: the dynamic flow control policy is a data flow steering policy in dependence upon which data flow to the NFV-implemented VNF from the network function is selectively controlled and/or in dependence upon which data flow forwarded from the NFV-implemented VNF to the network function is selectively controlled.

* * * * *